May 27, 1969

JAMES E. WEBB
ADMINISTRATOR OF THE NATIONAL AERONAUTICS
AND SPACE ADMINISTRATION
COATING PROCESS
Filed Feb. 17, 1967

3,446,642

INVENTORS.
ROBERT F. HOLTZE
CHARLES D. BAKER
By
ATTORNEYS.

United States Patent Office 3,446,642
Patented May 27, 1969

3,446,642
COATING PROCESS
James E. Webb, Administrator of the National Aeronautics and Space Administration, with respect to an invention of Robert F. Holtze, Pacoima, and Charles D. Baker, Lakewood, Calif.
Filed Feb. 17, 1967, Ser. No. 617,776
Int. Cl. C23c; B02c 11/08
U.S. Cl. 117—21                                1 Claim

ABSTRACT OF THE DISCLOSURE

Solid objects are coated essentially at room temperature with a resinous material that is initially fluid at that temperature. The resinous material is frozen and comminuted at sub-ambient temperature, and is contacted as a cold powder with the object to be coated. The powder melts on contact, forming a uniform coating which is subsequently cured substantially at ambient temperature to a hard solid.

---

The invention described herein was made in the performance of work under a NASA contract and is subject to the provisions of section 305 of the National Aeronautics and Space Act of 1958, Public Law 85–568 (72 Stat. 435; 42 USC 2457).

This invention has to do generally with the coating of solid objects with thin layers of solid resinous material which is initially in the form of finely divided solid particles.

In conventional practice of such processes, the finely divided solid resinous coating composition is commonly suspended in an upwardly moving stream of gas to form a fluidized bed. The object to be coated is immersed in the fluidized bed after being heated to a sufficiently high temperature to cause particles of resin to melt and coalesce on contact with the object. Curing of the coating usually requires that the object be maintained for an appreciable period at a still higher temperature. Processes of that type are described, for example, in U.S. Patents 2,844,489 to Erwin Gemmer and 3,028,251 to Fritz J. Nagel.

Such conventional processes are effective and convenient for coating many kinds of objects, including metals, ceramics and other materials that can withstand the relatively high temperatures required. A serious disadvantage of the conventional processes, however, is that they are useless for coating many objects which, themselves, melt or deteriorate at the temperatures required for fusing and curing the coating composition.

The present invention overcomes that limitation and permits processes of the fluidized bed type to be employed for coating essentially all solid objects, including those that comprise thermoplastic materials which soften or melt at slightly elevated temperatures. That is accomplished by shifting the entire coating process from the conventional super-ambient temperature range to a lower temperature range that is primarily or wholly sub-ambient. The resulting cold process is useful, for example, for applying a protective and insulating layer to printed circuit boards of fiberboard laminated with an epoxy.

In accordance with one aspect of the present invention, the resinous materials normally employed as coating compositions for fluidized bed or analogous processes are modified in composition in such a way that they are liquid or at least soft and highly plastic at or near normal room temperature, and become solid only at sub-ambient temperatures, typically at or below −40° F. The coating materials of the invention are also so formulated that they will cure at temperatures in the ambient range, progressively losing their plasticity and forming a hard durable solid. Such curing, as that term is used in the present specification and claims, may involve evaporation of a solvent, for example, or of a condensation product, or may result from polymerization which may be accelerated by inclusion of a suitable catalyst in the initial composition.

In accordance with another aspect of the present invention, coating materials having the properties just described are initially prepared in liquid form, typically at substantially ambient temperature, and are then cooled by refrigeration to a sub-ambient temperature low enough to make the particular material solid and preferable quite brittle. At that reduced temperature the solid coating material is ground or otherwise reduced to finely divided form of a particle size suitable for the selected method of application. The resulting powder can be stored effectively withhout agglomeration by maintaining it at a suitably reduced temperature.

In preferred form of the invention, the cold powdered coating material is suspended as a fluidized bed, using air or other gas that has been precooled by refrigeration to a suitable sub-ambient temperature. The entire fluidized bed apparatus is preferably maintained at similarly reduced temperature. That can usually be accomplished effectively by provision of suitable insulation, the continuous stream of cold gas being relied upon to cool the apparatus initially and to carry off any heat that is generated in the apparatus or enters through the insulation. The gas stream must be sufficiently precooled to avoid any tendency of the resin particles of the fluidized bed to coalesce. If air is used as a suspending stream, it must be well dried to prevent condensation of moisture.

With a fluidized bed of particulate coating material prepared as outlined above, the object to be coated may be immersed in the bed at substantially ambient temperature, and will become coated with an essentially uniform and continuous coating of coalesced particles. Upon removal of the coated article from the bed, the coating material cures progressively at room temperature, forming eventually a hard coating that is highly satisfactory. Such curing may be accelerated, if desired, by moderate warming, but high temperatures such as might injure the coated object are not required.

In accordance with a further aspect of the invention, the coating composition, after initial preparation at substantially ambient temperature, may be allowed to cure partially and to a limited and controlled extent before it is solidified by refrigeration. The low temperature at which the material is comminuted and stored effectively arrests the curing process. Hence, when the coating material is again raised to the temperatures in the ambient range by contact with the object to be coated, its physical properties correspond essentially to the stage of curing that was attained just before cooling. It is thus possible to control the viscosity, sintering temperature and other properties exhibited by the coating material during the actual coating step by selection of the degree of curing attained during initial preparation prior to refrigeration.

A full understanding of the invention, and of its further objects and advantages, will be had from the following description of an illustrative and preferred manner in which it may be carried out. The particulars of that description, as of accompanying drawing which forms a part of it, are intended only as illustration, and not as a limitation upon the scope of the invention, which is defined in the appended claim.

The drawing is a schematic diagram representing an illustrative system for carrying out the invention.

In the drawing the vessel 10 represents any suitable equipment for preparing a liquid organic coating material, typically a synthetic resin, having the desired characteristics. It is well known that in the formulation of synthetic resins such as phenolic, urea or epoxy resins, for example, the composition can be varied in such a way that the resin is initially liquid at or near room temperature and gradually becomes more viscous and eventually solidifies irreversibly to form a hard and coherent solid. That gradual process of solidification, referred to generally as curing, results from direct polymerization in some compositions, and involves condensation or simple evaporation of a solvent in other compositions. The temperature and rate at which such curing takes place can be controlled over wide limits by suitable selection of the proportions and type of known curing agents included in the composition, as described, for example, in United States Patent 1,776,366 to Emil E. Novotny.

In accordance with the present invention, the composition prepared at 10 is initially at least somewhat fluid at normal temperature and has curing characteristics such that it becomes progressively more viscous even at room temperature, eventually forming a hard solid. Such curing can be accelerated in conventional manner by moderate increase of temperature.

Materials of the type described can be solidified rapidly by sharp reduction of their temperature. In accordance with this invention, when the viscosity of the coating composition at 10 has reached a desired value, it is transferred to the freezing chamber indicated schematically at 12. That chamber is well insulated, as indicated by the double wall 13, and is cooled to a selected low temperature in any suitable manner. It will be understood that chamber 12 includes conventional means for dividing the resin to be frozen into pellets of suitable size for convenience of handling. As shown, a continuous flow of cold refrigerant is supplied from a source 14 via the pipe system 16. Refrigerant source 14 may represent a mechanical refrigeration machine of any suitable type, or may, for example, comprise a container of liquid nitrogen, solid carbon dioxide, or other source of cold fluid. The line 16 may represent a plurality of parallel lines containing refrigerant at suitable different temperatures. The refrigerant is typically circulated within the double wall of chamber 12 or through cooling coils within the chamber, not explicitly shown. The rate of freezing of the resin is usually not critical. However, if the composition is such that polymerization is proceeding rapidly at the temperature of tank 10, relatively rapid freezing facilitates arresting the curing at the desired point.

After freezing at 12, the resin is fed to suitable mechanism for grinding or otherwise dividing it into a fine powder, typically of an average particle diameter within the range from about 50 to about 500 microns. That comminuting apparatus is indicated schematically at 20. It operates entirely at a reduced temperature, as indicated by the insulating wall 22 and the refrigerant supply from line 16. The temperature for comminution is at least as low as that required for freezing the resin at 12, and may usefully be made considerably lower to provide enhanced embrittlement of the material. Pulverizing apparatus 20 may, for example, be of the general type described in U.S. Patent 2,609,150 to Robert E. Bludeau.

The fine powder from comminuting apparatus 20 may be stored under continuous refrigeration, as in the storage chamber indicated schematically at 26 with insulation 27 and with refrigerant supply from line 16. The most economical storage temperature depends upon the particular coating composition and the anticipated storage period entirely, or to reduce it to the brief time required to complete comminution of a batch of material at 20.

When an object is to be coated, powder is taken from storage chamber 26 or directly from comminutor 20 and is formed into a fluidized bed in apparatus represented schematically at 30. That apparatus comprises a container 32 enclosed by a well insulated wall 34 and divided by the partition 36 into the upper working chamber 40 and the lower entrance chamber 42. Partition 36 is made of a material, such as porous ceramic, for example, which is highly pervious to gas but presents an effectively solid barrier to particles of the coating powder. That powder is introduced, as indicated at 43, into working chamber 42, which is typically open at the top. Gas is supplied continuously to entrance chamber 44 under sufficient pressure to pass upward through partition 36 at a suitable rate to maintain the powder in suspension, creating the fluidized bed indicated at 46. An important feature of the present invention is that the air or other gas supplied to entrance chamber 44 and all of the walls enclosing the fluidized bed are cooled by refrigeration to a sub-ambient temperature, to maintain the bed in fluid condition. The exact air temperature required for that purpose depends upon the specific coating material being used, and also to some extent upon the length of time that the fluidized bed is to be maintained. In general, a temperature well below the softening temperature of the powder is preferred, a differential of at least 40 to 100° F. being typical.

In the system of the present drawing, air is supplied to entrance chamber 44 from the blower 50, which is continuously driven by the electric motor 52. That air is passed from blower 50 through the dryer indicated at 54 and the heat exchanger 56, in which the air is refrigerated to the selected sub-ambient temperature for supply to chamber 44. Heat exchanger 56 has the insulating walls 57 and may be of conventional type, employing refrigerant from mechanism 14, as indicated, or from an independent source if preferred. Dryer 54 may be incorporated in heat exchanger 56, excess moisture being typically removed from the air by condensation on the cooling coils of the heat exchanger. The resulting cold air supplied via the line 58 to entrance chamber 44 has a relative humidity low enough to prevent condensation of moisture in container 32. In the stream of refrigerated air entering container 32 at 58 is not sufficient to maintain that container at satisfactorily low temperature, the container can be further cooled by refrigerant supplied directly from line 16, as indicated at 59, or from any other suitable source.

In the figure an object to be coated is indicated schematically at 60, mounted on a support 62 by which it can be lowered into working chamber 42 and immersed in fluidized bed 46 for any desired time period. In preferred form of the invention, using a fluidized bed of synthetic resin having the properties described above, object 60 may be at substantially ambient temperature when introduced into the bed. Particles of the powder making up that bed are then heated essentially instantaneously to room temperature upon contacting the object, becoming sufficiently tacky to adhere to the object surface. Such adhered particles gradually flow together to form a smooth continuous layer of liquid or semiliquid material. The viscosity of that material depends, of course, upon the temperature of object 60, but is also determined, as already indicated, by the degree of curing that was allowed to take place in tank 10 before refrigerating the initial mixture.

When a sufficiently thick coating has formed on object 60, the latter is withdrawn from the fluidized bed and curing is allowed to proceed to completion, either at room temperature or under the acceleration of slightly elevated temperature. The liquid or semiliquid coating is thereby converted irreversibly to a hard and durable layer having the characteristics determined by the initial formulation selected at 10. However, that layer has been produced without raising the temperature of the object 60 significantly above the ambient range.

The following specific example illustrates how the present invention may be carried out. Two liquid compounds are mixed together essentially at room temperature. The first compound is a polyester-base prepolymer derived from castor oil and having an equivalent weight per NCO group of 420 and an equivalent NCO content of 10%. The second compound is a urethane grade of castor oil with an isocyanate equivalent weight of 442 and a hydroxyl number of 163. These materials are available commercially as Solithane 113 and DB castor oil, respectively. They are typically mixed in the ratio of 100 parts by weight of the polyester-base prepolymer to 74 parts by weight of the castor oil. The viscosity of the resulting liquid increases due to polymerization. At a selected viscosity, typically 40,000 centipoises, the liquid material is converted into a solid by quick freezing in liquid nitrogen, halting the polymerization reaction. The frozen solid mixture is then ground into a fine powder while maintained at a temperature below −40° F. The object to be coated, while at essentially room temperature, is contacted with the frozen powder by any desired method, but preferably by means of a cold fluidized bed produced in the manner already described. As the frozen powdered coating material contacts the relatively warm substrate it is warmed to room temperature and again becomes liquid, forming a smooth even coating. The return to room temperature also causes renewed polymerization of the two compounds of the coating, and that polymerization continues until a solid coating results.

Whereas the process of the invention is capable of coating an object and producing a fully cured protective layer while maintaining the object strictly at room temperature, it is usually convenient in practice to depart slightly from that ideal relation. For example, even with a coating composition that becomes tacky when raised only to room temperature, it is usually desirable to warm the object somewhat before immersing it in the fluidized bed in order to provide a reservoir of heat available throughout the immersion period. The temperature required for that purpose depends, of course, upon the size of the object and the thickness of coating desired. An initial temperature excess of about 20 to 50° F. is usually sufficient for that purpose. The term "substantially ambient temperature," as used in the present specification and claims is intended to include such moderately elevated temperatures, which do not damage any ordinary object that might require coating.

What is claimed is:

1. The method of coating an object with solid synthetic resin, said method comprising the combination of preparing a liquid coating composition consisting essentially of synthetic resin that is liquid at substantially ambient temperature and that forms reversibly a hard solid when cooled to a subnormal temperature range below about −40° F., said composition being curable at substantially ambient temperature to form irreversibly a hard solid, refrigerating the liquid composition to said subnormal temperature range to form a hard solid, comminuting the refrigerated solid, while within said subnormal temperature range, to an average particle size between about 50 and about 500 microns, providing an upward stream of refrigerated gas at a temperature within said subnormal range, suspending the comminuted solid in said upward stream to produce a cold fluidized bed, contacting an object to be coated, while at substantially ambient temperature, with said cold fluidized bed to adhere particles of the comminuted solid to the object and thereby to coat the object with said composition, and curing the resulting coating at substantially ambient temperature to form irreversibly a hard solid.

References Cited

UNITED STATES PATENTS

| | | | |
|---|---|---|---|
| 1,901,324 | 3/1933 | Novotny | 117—119.2 |
| 2,595,831 | 5/1952 | De Nie et al. | 241—23 |
| 2,706,311 | 4/1955 | Durst et al. | 260—2.5 X |
| 2,889,291 | 6/1959 | Moore | 260—2.5 X |
| 3,202,533 | 8/1965 | Sachsel et al. | 117—72 |
| 3,279,936 | 10/1966 | Forestek | 117—5.3 X |

WILLIAM D. MARTIN, *Primary Examiner.*

P. ATTAGUILE, *Assistant Examiner.*

U.S. Cl. X.R.

241—23